(12) United States Patent
Song

(10) Patent No.: US 12,006,475 B2
(45) Date of Patent: Jun. 11, 2024

(54) ORGANIC SOLID BIOMASS CONVERSION FOR LIQUID FUELS/CHEMICALS PRODUCTION IN THE PRESENCE OF METHANE CONTAINING GAS ENVIRONMENT AND CATALYST STRUCTURE

(71) Applicant: Kara Technologies Inc., Calgary (CA)

(72) Inventor: Hua Song, Calgary (CA)

(73) Assignee: KARA TECHNOLOGIES INC., Calgary (CA)

( * ) Notice: Subject to any disclaimer, the term of this patent is extended or adjusted under 35 U.S.C. 154(b) by 0 days.

(21) Appl. No.: 17/411,232

(22) Filed: Aug. 25, 2021

(65) Prior Publication Data

US 2022/0064538 A1 Mar. 3, 2022

Related U.S. Application Data

(60) Provisional application No. 63/192,720, filed on May 25, 2021, provisional application No. 63/070,368, filed on Aug. 26, 2020.

(51) Int. Cl.
| | |
|---|---|
| *C10G 1/08* | (2006.01) |
| *B01J 29/40* | (2006.01) |
| *B01J 37/00* | (2006.01) |
| *B01J 37/03* | (2006.01) |
| *B01J 37/06* | (2006.01) |

(Continued)

(52) U.S. Cl.
CPC ............ *C10G 1/086* (2013.01); *B01J 29/405* (2013.01); *B01J 37/0027* (2013.01); *B01J 37/031* (2013.01); *B01J 37/06* (2013.01); *B01J 37/088* (2013.01); *C10G 5/00* (2013.01); *C10G 2300/1003* (2013.01); *C10G 2300/1011* (2013.01); *C10G 2300/202* (2013.01);

(Continued)

(58) Field of Classification Search
None
See application file for complete search history.

(56) References Cited

U.S. PATENT DOCUMENTS

| 3,471,412 A | 10/1969 | Miale et al. |
| 5,116,794 A | 5/1992 | Skeels et al. |

(Continued)

FOREIGN PATENT DOCUMENTS

| CN | 2645080 Y | 9/2004 |
| CN | 1552802 A | 12/2004 |

(Continued)

OTHER PUBLICATIONS

Machine translation CN 104096571. Retrieved Sep. 21, 2022 (Year: 2022).*

(Continued)

*Primary Examiner* — In Suk C Bullock
*Assistant Examiner* — Alyssa L Cepluch
(74) *Attorney, Agent, or Firm* — Edell, Shapiro & Finnan, LLC

(57) ABSTRACT

A method provides for valorization of naturally abundant organic solid biomass under a specified gas atmosphere with the existence of a catalyst structure. The method effectively converts the organic solid feedstock while producing valuable liquid hydrocarbon products, as well as utilizing methane rich resources, providing an economical and environmental benefit in the oil & gas industry.

11 Claims, 3 Drawing Sheets

(51) Int. Cl.

| | |
|---|---|
| B01J 37/08 | (2006.01) |
| C10G 5/00 | (2006.01) |

(52) U.S. Cl.

CPC ............... *C10G 2300/308* (2013.01); *C10G 2300/4006* (2013.01); *C10G 2300/4012* (2013.01)

(56) References Cited

U.S. PATENT DOCUMENTS

| | | | |
|---|---|---|---|
| 5,536,895 | A | 7/1996 | Nair et al. |
| 5,770,047 | A | 6/1998 | Salazar et al. |
| 6,017,442 | A | 1/2000 | Wu et al. |
| 6,051,520 | A | 4/2000 | Wu |
| 6,579,444 | B2 | 6/2003 | Feimer et al. |
| 8,066,869 | B2 | 11/2011 | Nicolaos et al. |
| 8,092,766 | B2 | 1/2012 | Ghorishi et al. |
| 8,444,725 | B2 * | 5/2013 | Agrawal ............... C10J 3/02 423/644 |
| 2008/0115415 | A1 | 5/2008 | Agrawal et al. |
| 2009/0288990 | A1 | 11/2009 | Xie et al. |
| 2010/0299990 | A1 * | 12/2010 | Aradi ............... B01J 23/83 977/773 |
| 2013/0060070 | A1 * | 3/2013 | Huber ............... C10G 1/10 585/242 |
| 2013/0261355 | A1 * | 10/2013 | Stamires ............... C10G 1/086 502/232 |
| 2018/0100107 | A1 | 4/2018 | Alhooshani |
| 2018/0142159 | A1 | 5/2018 | Ajay et al. |
| 2018/0171244 | A1 | 6/2018 | Harandi |
| 2018/0265787 | A1 | 9/2018 | Raman et al. |
| 2018/0298294 | A1 * | 10/2018 | Magrini ............... C10G 3/50 |
| 2019/0366310 | A1 | 12/2019 | Monguillon et al. |
| 2020/0261894 | A1 | 8/2020 | Song et al. |

FOREIGN PATENT DOCUMENTS

| | | |
|---|---|---|
| CN | 1598568 A | 3/2005 |
| CN | 1234804 C | 1/2006 |
| CN | 102869427 A | 1/2013 |
| CN | 103933995 A | 7/2014 |
| CN | 104056658 A | 9/2014 |
| CN | 104069852 A | 10/2014 |
| CN | 104096571 A | 10/2014 |
| CN | 104907076 A | 9/2015 |
| CN | 205603525 U | 9/2016 |
| CN | 205603535 U | 9/2016 |
| CN | 205627574 U | 10/2016 |
| CN | 205628890 U | 10/2016 |
| CN | 107029780 A | 8/2017 |
| CN | 107418619 A | 12/2017 |
| GB | 2314089 A | 12/1997 |
| JP | 2009-242507 A | 10/2009 |
| RU | 2005119994 | 4/2007 |
| WO | 2016196517 A1 | 12/2016 |
| WO | 2017051260 A1 | 3/2017 |
| WO | 2020170042 A1 | 8/2020 |
| WO | 2022038514 A1 | 2/2022 |

OTHER PUBLICATIONS

Notification of Transmittal of International Search Report and Written Opinion including International Search Report and Written Opinion for International Application No. PCT/IB2020/000151 dated Jul. 10, 2020, 10 pages (NPL1).

Juybar, M. et al, Conversion of methanol to aromatics over ZSM-5/11 intergrowth Zeolites and bimetallic ZN—Cu-ZSM-5/11 . . . , J.Chem. Sci (2019) 131:104, 14 pages (NPL83).

Uslamin, E.A. et al., Aromatization of ethylene over zeolite-based catalysts, Catalysis Science & Technology, Jan. 6, 2020, 10 pages 2774-2785, 13 pages (NPL74).

Harrhy, J., Wang, A., Jarvis , J., He, P., Meng, S., Yung, M., Liu, L., Song, H., "Understanding zeolite deactivation by sulphur poisoning during direct olefin upgrading", Nature Communications Chemistry, (2019), 2, 37 (NPL 12).

He, P., Song, H.*, "Catalytic Natural GasJuybar Utilization on Unconventional Oil Upgrading", Advances in Natural Gas Emerging Technologies, ISBN 978-953-51-3433-6, Rijeka, Croatia: InTech (2017) (NPL77).

Wang, A., Austin, D., Song, H.*, "Catalytic Biomass Valorization", Biomass vol. Estimation and Valorization for Energy, ISBN 978-953-51-2937-0, Rijeka, Croatia: InTech (2017) (NPL80).

"Catalytic Hydrogen Production from Bioethanol", Bioethanol (2012) MAP Lima, Hua Song p. 255 (NPL75).

Song, H.; Ozkan, U.S. "Hydrogen Production from Steam Reforming of Bio-Ethanol over Non-Precious Metal Catalysts", 21st North American Catalysis Society Meeting, San Francisco, CA, Jun. 2009 (NPL111).

H Song, RB Watson, P Matter, D Braden, U Ozkan, "Alcohol Steam Reforming for Hydrogen Production", (2005) 2005 AIChE Annual Meeting (NPL84).

Austin, D., Wang, A., Harrhy, J., Mao, X., Zeng, H., Song, H .*, "Catalytic Aromatization of Acetone as a Model Compound for Biomass Derived Oil under Methane Environment", Catalysis Science & Technology (2018) 8, 5104-5114 (NPL3).

Austin, D.; Wang, A.; He, P.; Qian, H.; Zeng, H.; Song, H.*, "Catalytic Valorization of Biomass Derived Glycerol under Methane: Effect of Catalyst Synthesis Method", Fuel, (2018) 216, 218-226 (NPL4).

He, P., Song, H.* , "Catalytic Conversion of Biomass by Natural Gas for Oil Quality Upgrading", Industrial & Engineering Chemistry Research, (2014) 53 (41), 15862-15870 (NPL13).

He, P., Shan, W., Xiao, Y., Song, H.*, "Performance of Zn/ZSM-5 for In Situ Catalytic Upgrading of Pyrolysis Bio-oil by Methane", Topics in Catalysis, (2016) 59(1), 86-93 (NPL22).

Peng, H., Wang, A., He, P., Harrhy, J., Meng, S., Song, H.*, "Solvent-free catalytic conversion of xylose with methane to aromatics over Zn—Cr modified zeolite catalyst", Fuel, (2019), 253, 988-996 (NPL38).

Peng, H., Wang, A., He, P., Meng, S., Song, H.*, "One-pot direct conversion of bamboo to aromatics under methane", Fuel (2020), 267, 117196 (NPL39).

Wang, A., Austin, D., He, P., Ha, M., Michaelis, V., Liu, L., Qian, H., Zeng, H., Song, H.*, "Mechanistic Investigation on Catalytic Deoxygenation of Phenol as a Model Compound of Biocrude Under Methane", ACS Sustainable Chemistry & Engineering (2019) 7(1), 1512-1523 (NPL59).

Wang, A., Austin, D., He, P., Mao, X., Zeng, H., Song, H.*, "Direct Catalytic Co-conversion of Cellulose and Methane to Renewable Petrochemicals", Catalysis Science & Technology, (2018) 8, 5632-5645 (NPL60).

Wang, A., Austin, D., Karmakar, A., Bernard, G., Michaelis, V., Yung, M., Zeng, H., Song, H.*, "Methane Upgrading of Acetic Acid as a Model Compound for Biomass Derived Liquid over Modified Zeolite Catalyst", ACS Catalysis (2017) 7, 3681-3692 (NPL61).

Wang, A., Austin, D., Qian, H., Zeng, H., Song, H.*, "Catalytic Valorization of Furfural Under Methane Environment", ACS Sustainable Chemistry & Engineering (2018) 6 (7), 8891-8903 (NPL62).

Wang, A., Austin, D., Song, H.*, "Investigations of thermochemical upgrading of biomass and its model compounds: Opportunities for methane utilization", Fuel, (2019) 246, 443-453 (NPL63).

Wang, A., He, P., Yung, M., Zeng, H., Qian, H., Song, H.*, "Catalytic Co-Aromatization of Ethanol and Methane", Applied Catalysis B: Environmental, (2016) 198, 480-492 (NPL65).

Wang, A., Austin, D., Song, H.*, "Catalytic Upgrading of Biomass and its Model Compounds for Fuel Production", Current Organic Chemistry, (2019), 23(5), 517-529 (NPL67).

Wang, A., Song, H.*, "Maximizing the Production of Aromatic Hydrocarbons from Lignin Conversion by Coupling Methane Activation", Bioresource Technology, (2018) 268, 505-513 (NPL68).

Xiao, Y., He, P., Cheng, W., Liu, J., Shan, W., Song, H.*, "Converting Solid Wastes into Liquid Fuel using a Novel Methanolysis Process", Waste Management, (2016) 49, 304-310 (NPL69).

Guo, A., Zhou, Y., Chen, K., Xue, Z., Wang, Z., Song, H.*, "Co-processing of Vacuum Residue/Fraction Oil Blends: Effect of

(56) References Cited

OTHER PUBLICATIONS

Fraction Oils Recycle on the Stability of Coking Feedstock", Journal of Analytical and Applied Pyrolysis (2014) 109, 109-115 (NPL10).

He, P., Chen, Y., Jarvis, J., Meng, S., Liu, L., Wen, X., Song, H.*, "Highly selective aromatization of octane over Pt—Zn/UZSM-5: The effect of Pt—Zn interaction and Pt position", ACS Applied Materials & Interfaces, (2020), DOI: 10.1021/acsami.0c07039 (NPL 14).

He, P., Gatip, R., Yung, M., Zeng, H., Song, H.*, "Co-Aromatization of Olefin and Methane over Ag—Ga/ZSM-5 Catalyst at Low Temperature", Applied Catalysis B: Environmental (2017) 211, 275-288 (NPL15).

He, P., Jarvis, J., Meng, S., Li, Q., Bernard, G., Liu, L., Mao, X., Jiang, Z., Zeng, H., Michaelis, V., Song, H.*, "Co-aromatization of methane with propane over Zn/HZSM-5: The methane reaction pathway and the effect of Zn distribution", Applied Catalysis B: Environmental , ( 2019) 250, 99-111 (NPL 17).

He, P., Jarvis, J., Meng, S., Wang A., Kou, S., Gatip, R., Yung, M., Liu, L., Song, H.*, "Co-Aromatization of Methane with Olefins: The Role of Inner Pore and External Surface Catalytic Sites", Applied Catalysis B: Environmental, (2018), 234, 234-246 (NPL18).

He, P., Meng, S., Song, Y., Liu, B., Song, H.*, "Heavy Oil Catalytic Upgrading under Methane Environment: A Small Pilot Plant Evaluation", Fuel , ( 2019), 258, 116161 (NPL21).

He, P., Wang, A., Meng, S., Bernard, G., Liu, L., Michaelis, V., Song, H.*, "Impact of Al sites on the methane co-aromatization with alkanes over Zn/HZSM-5", Catalysis Today (2019) 323, 94-104 (NPL23).

Investigation on the light alkanes aromatization over Zn and Ga modified HZSM-5 catalysts in the presence of methane, Q Li, F Zhang, J Jarvis, P He, M Yung, A Wang, K Zhao, H Song (2018) Fuel 219, 331-339 (NPL27).

Jarvis, J., Harrhy, J., He, P., Wang, A., Liu, L., Song, H.*, "Highly Selective Aromatization and Isomerization of n-Alkanes from Bimetallic Pt—Zn Nanoparticles Supported on a Uniform Aluminosilicate", Chemical Communications, (2019) 55, 3355-3358 (NPL28).

Jarvis, J., Wong, A., He, P., Li, Q., Song, H.*, "Catalytic aromatization of naphtha under methane environment: Effect of surface acidity and metal modification of HZSM-5", Fuel, (2018) 223, 211-221 (NPL30).

Li, Q., He, P., Jarvis, J., Bhattacharya, A., Mao, X., Wang, A., Bernard, G., Michaelis, V., Zeng, H., Liu, L., Song, H.*, "Catalytic co-aromatization of methane and heptane as an alkane model compound over Zn—Ga/ZSM-5: A mechanistic study", Applied Catalysis B: Environmental, (2018) 236, 13-24 (NPL31).

Lou, Y., He, P., Zhao, L., Song, H.*, "Highly Selective Olefin Hydrogenation: Refinery Oil Upgrading over Bifunctional PdOx/ H-ZSM-5 Catalyst", Catalysis Communications, (2016) 87, 66-69 (NPL34).

Meng, S., Wang, A., He, P., Song, H.*, "Non-thermal plasma assisted photocatalytic conversion of simulated natural gas for high quality gasoline production near ambient conditions", The Journal of Physical Chemistry Letters, (2020), 11, 3877-3881 (NPL37).

Shen, Z., He, P., Wang, A., Harrhy, J., Meng, S., Peng, H., Song, H.*, "Conversion of naphthalene as model compound of polyaromatics to mono-aromatic hydrocarbons under the mixed hydrogen and methane atmosphere", Fuel (2019) 243, 469-477 (NPL42).

Shen, Z., Ke, M., Lan, L., He, P., Liang, S., Zhang, J., Song, H.*, "Active phases and reaction performance of Mo improved Ni/Al2O3 catalysts for thioetherification", Fuel, (2019) 236, 525-534 (NPL43).

Chen, G., Yuan, W., Wu, Y., Zhang, J., Song, H., Jeje, A., Song, S., Qu, C., "Catalytic aquathermolysis of heavy oil by coordination complex at relatively low temperature", Petroleum Chemistry, (2017) 57 (10), 881-884 (NPL5).

Sun, X., He, P., Gao, Z., Liao, Y., Weng, S., Zhao, Z., Song, H.*, Zhao, Z.*, "Multi-Crystalline N-doped Cu/CuxO/C Foam Catalyst Derived from Alkaline N-coordinated HKUST-1/CMC for Enhanced 4-Nitrophenol Reduction", Journal of Colloid and Interface Science, (2019), 553, 1-13 (NPL57).

Wang, A., Harrhy, J., Meng, S., He, P., Liu, L., Song, H.*, "Nonthermal Plasma-Catalytic Conversion of Biogas to Liquid Chemicals with Low Coke Formation", Energy Conversion & Management, (2019), 191, 93-101 (NPL64).

Wang, A., Meng, S., Song, H.*, "Non-thermal plasma induced photocatalytic conversion of light alkanes into high value-added liquid chemicals at near ambient conditions", Chemical Communications, (2020), 56, 5263-5266 (NPL66).

Lou, Y., He, P., Zhao, L., Cheng, W., Song, H.*, "Olefin Upgrading over Ir/ZSM-5 catalysts under methane environment", Applied Catalysis B: Environmental , (2017) 201, 278-289 (NPL33).

He, P., Lou, Y., Song, H.*, "Olefin Upgrading under Methane Environment over Ag-Ga/ZSM-5 Catalyst", Fuel, (2016), 182, 577-587 (NPL19).

Xu, H., Li, Z., Pryde, R., Meng, S., Li, Y., Song, H.*, "Participation of methane in economically and environmentally favorable catalytic asphaltene upgrading process", Chemical Communications, (2020), 56, 5492-5495 (NPL70).

Jarvis, J., He, P., Wang, A., Song, H.*, "Pt—Zn/HZSM-5 as a Highly Selective Catalyst for the Co-aromatization of Methane and Light Straight Run Naphtha", Fuel (2019) 236, 1301-1310 (NPL29).

Lou, Y., He, P., Zhao, L., Song, H.*, "Refinery Oil Upgrading under Methane Environment over PdOx/H-ZSM-5: Highly Selective Olefin Cyclization", Fuel , (2016) 183, 396-404 (NPL35).

He, P., Wen, Y., Jarvis, J., Gatip, R., Austin, D., Song, H.*, "Selective Participation of Methane in Olefin Upgrading over Pd/ZSM-5 and Ir/ZSM-5: Investigation using Deuterium Enriched Methane", ChemistrySelect, (2017) 2, 252-256 (NPL24).

Guo, A., Wei, Z., Zhao, B., Chen K., Liu, D., Wang, Z., Song, H.*, "Separation of Toluene-Insoluble Solids in the Slurry Oil from a Residual Fluidized Catalytic Cracking Unit: Determination of the Solid Content and Sequential Selective Separation of Solid Components", Energy & Fuels, (2014) 28 (5), 3053-3065 (NPL8).

He, P., Xiao, Y., Tang, Y., Zhang, J., Song, H.*, "Simultaneous Low-Cost Carbon Sources and CO2 Valorizations through Catalytic Gasification", Energy & Fuels, (2015) 29 (11), 7497-7507 (NPL25).

He, P., Jarvis, J., Liu, L., Song, H.*, "The promoting effect of Pt on the co-aromatization of pentane with methane and propane over Zn—Pt/HZSM-5", Fuel (2019) 239, 946-954 (NPL 16).

Meng et al., "Non-thermal plasma assisted catalytic reforming of naphtha and its model compounds with methane at near ambient conditions", Applied Catalysis B: Environmental (2021), 11 pages (NPL116).

Hao Xu et al., "Methane-assisted waste cooking oil conversion for renewable fuel production", Science Direct (2022), 9 pages (NPL 117).

Jarvis et al., "Inhibiting the Dealkylation of Basic Arenes during n-Alkane Direct Aromatization Reactions and Understanding the C6 Ring Closure Mechanism", ACS Catalysis (2020), pp. 8428-8443 (NPL118).

Hao Xu et al., "Highly selective skeletal isomerization of cyclohexene over zeolite-based catalysts for high-purity methylcyclopentene production", communications chemistry (2021), 9 pages (NPL119).

Zhaofei Li, et al., "Effect of methane presence on catalytic heavy oil partial upgrading", ScienceDirect (2021), 8 pages (NPL120).

Hoa Xu et al., "Catalytic vacuum residue upgrading under methane: Evaluation of process feasibility, stability and versatility", ScienceDirect (2022), 8 pages (NPL 121).

Yimeng Li et al., "Catalytic methanotreating of vegetable oil: A pathway to Second-generation biodiesel", ScienceDirect (2022), 8 pages (NPL122).

Yimeng Li et al., Catalytic desulfurization of marine gas oil and marine diesel oil under methane environment, ScienceDirect (2021) 6 pages (NPL123).

Hao Xu et al., "Catalytic asphaltene upgrading under methane environment: Solvent effect and its interaction with oil components", ScienceDirect, (2021) 7 pages (NPL124).

Wenping Li et al., "The function of porous working electrodes for hydrogen production from water splitting in non-thermal plasma reactor", ScienceDirect (2022), 9 pages (NPL125).

Hoa Xu et al., "Organic solid waste upgrading under natural gas for valuable liquid products formation: Pilot demonstration of a highly integrated catalytic process", ScienceDirect (2022), 10 pages (NPL126).

(56) References Cited

OTHER PUBLICATIONS

Hao Xu et al., "The interactive role of methane beyond a reactant in crude oil upgrading", communications chemistry (2021), 12 pages (NPL127).
Shan, W., Song, H.*, "Catalysts for the Selective Catalytic Reduction of NOx with NH3 at Low Temperature", Catalysis Science & Technology, (2015) 5, 4280-4288 (NPL41).
Song, H., Zhang, L., Ozkan, U.S., "The Effect of Surface Acidic and Basic Properties on the Performance of Cobalt-Based Catalysts for Ethanol Steam Reforming", Topics in Catalysis, (2012) 55 (19-20), 1324-1331 (NPL56).
Song, H.; Shan, W.; Xiao, Y.; Cheng, W. "Catalytic biomass pyrolysis under methane-rich gas for upgraded bio-oil production", 65th Canadian Chemical Engineering Conference, Calgary, AB, Oct. 2015 (NPL112).
Song, H.*, Meng, S., Wang, A., He, P., "Catalytic Methane Valorization at Mild Conditions through Coupling Effect", 69th Canadian Chemical Engineering Conference, Halifax, NS, Oct. 2019 (Invited keynote) (NPL93).
Song, Hua "Catalytic low cost carbon resources pyrolysis under natural gas for upgraded oil production" Mar. 2014 Conference: 247th National Spring Meeting of the American-Chemical-Society (ACS), vol. 247 (NPL114).
Song, H.; Guo, A.; Wu, C.; Zhang, D.; Luan, Y.; Zhao, L. "Catalytic heavy crude oil upgrading using natural gas", 249th ACS National meeting, Denver, CO, Mar. 2015 (NPL109).
Song, H.*; Zhao, L.; He, P. "Catalytic Bitumen Partial Upgrading Under Methane Environment", 2016 AICHE National Meeting, San Francisco, CA, Nov. 2016 (NPL95).
Wang, A., He, P., Song, H.*, "Lignin valorization", Recent Advances in Bioconversion of Lignocellulose to Biofuels and Value Added Chemicals within the Biorefinery Concept, ISBN 978-0-12-818223-9, Elsevier (2020) (NPL81).
Aiguo Wang et al., "Catalytic Upgrading of Biomass and Its Model Compounds under Methane Environment" Conference Paper, University of Calgary, 1 page (NPL128) 2022.
He, P. et al., "Catalytic Light Olefin Upgrading under Methane Environment", 254th ACS National meeting, University of Calgary, Aug. 2017, 44 pages, (NPL129).
He, P. et al., "Catalytic Upgrading of Low Cost Carbon Resources Under Methane Environment", University of Calgary, Sep. 2018, 44 pages (NPL 130).
Notification of Transmittal of International Search Report & Written Opinion including International Search Report & Written Opinion for International Application No. PCT/IB2021/057564, dated Nov. 29, 2021, 14 pages (NPL131).
Notification of Transmittal of International Search Report & Written Opinion including International Search Report & Written Opinion for International Application No. PCT/IB2021/057565, dated Nov. 10, 2021, 15 pages (NPL132).
Notification of Transmittal of International Search Report & Written Opinion including International Search Report & Written Opinion for International Application No. PCT/IB2021/057789, dated Aug. 25, 2021, 13 pages (NPL133).
Official Action for Eurasian Patent Application No. 202192284 issued by the Eurasian Patent Office dated Mar. 30, 2022 with English translation, 20 pages (NPL134).
Xu et al., Communications Chemistry, vol. 4, epub. Mar. 11, 2021, Article 34 (NPL135).
Aboul-Gheit et al., Journal of Molecular Catalysis A: Chemical, vol. 245, 2006, epub. Nov. 7, 2005, pp. 167-177 (NPL136).
Notice for Reason for Rejection for Japanese Patent Application No. 2021-549183 dated Sep. 6, 2022 with English translation, 6 pages.
He Peng et al., Catalytic bitumen partial upgrading over Ag—Ga/ZSM-5 under methane environment, Fuel Processing Technology, Elsevier BV, NL, vol. 156 Sep. 21, 2016, pp. 290-297, XP029825240 ossm 0378-3820, DOI: 10.1016/J.FUPROC.2016.09.010.
Extended European Search Report for European Patent Application No. 20759245.2 dated Oct. 10, 2022, 9 pages.
Official Action from the Mexican Patent Office for Mexican Patent Application No. MX/a/2021009807 dated Apr. 10, 2023 with English Translation, 9 pages.
Official Action from the China National Intellectual Property Administration for Chinese Patent Application No. 202080015663.4 dated Feb. 6, 2023 with English Translation, 16 pages.
Notification of Transmittal of International Search Report and Written Opinion including International Search Report and Written Opinion for International Patent Application No. PCT/IB2022/050716 dated Apr. 27, 2022, 10 pages.
Unfavorable Opinion for Brazil Patent Application N° BR112023003209-1 dated Feb. 22, 2024 with English translation, 13 pages.
Notification of Second Office Action for Chinese Patent Application No. 202080015663.4 with English translation, dated Oct. 10, 2023, 15 pages.
First Examination Report for Indian Application No. 202347019002 with English translation, dated Nov. 14, 2023, 7 pages.

* cited by examiner

ORGANIC SOLID BIOMASS CONVERSION FOR LIQUID FUELS/CHEMICALS PRODUCTION IN THE PRESENCE OF METHANE CONTAINING GAS ENVIRONMENT AND CATALYST STRUCTURE

CROSS-REFERENCE TO RELATED APPLICATIONS

The present application claims priority from U.S. Provisional Patent Application Ser. No. 63/070,368, filed Aug. 26, 2020 and entitled "Organic Solid Wastes Conversion for Liquid Fuels/Chemicals Production in the Presence of Methane Containing Gas Environment and Catalyst Structure", and from U.S. Provisional Patent Application Ser. No. 63/192,720, filed May 25, 2021 and entitled "Organic Solid Wastes Conversion for Liquid Fuels/Chemicals Production in the Presence of Methane Containing Gas Environment and Catalyst Structure", the disclosures of which are incorporated herein by reference in their entireties.

FIELD

The invention relates to a method for organic solid biomass valorization and belongs to the technical field of solid feed processing and upgrading.

BACKGROUND

Organic solid wastes including municipal solid wastes, agricultural and forestry residues are receiving increasing attention worldwide as a feedstock, as the only sustainable alternative to fossil fuels, for renewable liquid fuel and chemical production owing to its low cost, availability and carbon-neutral nature. Nevertheless, it is still not widely used as raw materials in those areas due to technological and economic concerns.

Pyrolysis of organic solid wastes is one way to produce crude bio-oils in addition to gases and bio-chars. The bio-oil obtained from direct pyrolysis, however, gradually ages because of low H/C ratio and it ages faster when exposed to light, oxygen gas, or heat above 80° C., leading to storage and stability issues. In addition, due to its high oxygen content, the produced bio-crude has lower heating value, making it unsatisfactory for being employed as substituent for traditional liquid fuel for power generation, and further contains contaminants such as sulfur, nitrogen, chlorine, and trace metals.

To overcome these issues, various processes have been developed to upgrade the bio-oil by removing or chemically modifying the undesired compounds. The most widely employed process is hydrodeoxygenation. It can produce a better quality, energy dense, and non-corrosive product, which can be further upgraded. However, it has to consume large quantities of hydrogen and operate under high pressure conditions (e.g., about 15 atm to about 35 atm). The involvement of such an expensive hydrogen source which is not naturally available will inevitably result in significant cost increase of this upgrading process. Moreover, such high pressure operation will definitely lead to further increased capital and operation cost.

An alternative way to upgrade a bio-oil is catalytic cracking on zeolite, which can produce aromatics at atmospheric pressure without the requirement of hydrogen. This process is still in its infancy and suffers from the low H/C content of the end product. Accordingly, it is greatly desirable to develop an economic-attractive process with abundant and readily available raw materials to achieve the upgrading of bio-oil.

Methane is the main component in natural gas, which is a natural occurring resource with underestimated values. The production of natural gas has rocketed in the past decades mainly due to the so-called shale gas revolution in North America with a corresponding decrease in price. If methane or natural gas can be utilized as a hydrogen donor for organic solid wastes upgrading to produce high value-added liquid products, not only the process can be more environmentally and economically friendly, but also the added value of natural gas can be greatly enhanced, which is highly beneficial and profitable for the current petroleum and natural gas industry. In addition, if the associated operating pressure can be further reduced, the whole process can be more economically attractive and competitive.

BRIEF SUMMARY

In accordance with the embodiments described herein, a method for the valorization of an organic solid biomass feedstock for liquid fuel and/or chemical productions comprises introducing an organic solid biomass feedstock into within a reaction zone of a methanolysis reaction system in the presence of a methane-containing gas and a methanolysis catalyst structure so as to convert the solid organic feedstock, via methanolysis, to a liquid bio-oil product and a synthetic gas product, and introducing the synthetic gas product into a liquefaction reaction system in the presence of a second gas (optional) and a liquefaction catalyst structure so as to convert the synthetic gas product, via liquefaction, to a liquid oil product.

In other embodiments, a method of forming a liquefied fuel oil product comprises providing a synthetic gas as an input to a mixed bed reactor including a plurality of liquefaction catalyst structures, liquefying the syngas to yield a liquefied fuel oil product and a gaseous product, and separating the liquefied fuel oil product from the gaseous product.

In still further embodiments, a method of forming a methanolysis catalyst structure comprises dissolving two or more metal salts in water to form a metal precursor solution comprising any two or more metals selected from the group consisting of Mo, Ni, Co, Ag, Ga, Ce, and Zn, loading the metal precursor solution into a porous support structure, drying the porous support structure loaded with metal precursor for a period of at least 2 hours at a temperature from about 80° C. to about 120° C., and calcining the dried support structure loaded with metal precursor in a gas atmosphere and at a temperature ranging from about 300° C. to about 700° C. and at a heating rate ranging from about 5° C./min to about 20° C./min to form the methanolysis catalyst structure.

In still further embodiments, a method of forming a liquefaction catalyst structure comprises dissolving two metal salts in water to form a mixed metal precursor solution, introducing an alkaline solution as a precipitation agent to the mixed metal precursor solution in a dropwise manner under agitation to form a slurry, aging the slurry at a temperature from about 25° ° C. to about 28 °C for at least 12 hours, repeatedly washing and filtering the aged slurry to form resulting precipitates, followed by drying the resulting precipitates at about 90° C. to about 105° C. for a time period from about 6 hours to about 12 hours to form a dried support structure, calcining the dried support structure at 550° C. for 3 hours under static air to form a mixed metal oxide support structure, dissolving a single alkali metal salt in water to form a metal precursor solution, loading the metal precursor solution into the mixed metal oxide support structure, drying the mixed metal oxide support structure loaded with the metal precursor for a period of at least 2 hours and at a temperature from about 80° ° C. to about 120° ° C. to form a dried catalyst structure loaded with a single alkali metal, and calcining the dried catalyst structure loaded with the single alkali metal in a gas atmosphere and at a temperature ranging from about 300° C. to about 700° C. and at a heating rate ranging from about 5° C./min to about 20° C./min to form the liquefaction catalyst structure.

Methods, systems and catalyst structures are further described herein for achieving organic solid biomass valorization and in a specific gas environment, which can effectively produce value-added liquid fuel and/or chemicals with simple process operations.

The above and still further features and advantages of the present invention will become apparent upon consideration of the following detailed description of specific embodiments thereof.

BRIEF DESCRIPTION OF THE DRAWINGS

Drawings are included for the purpose of illustrating certain aspects of the invention. Such drawings and the description thereof are intended to facilitate understanding and should not be considered limiting of the invention. Drawings are included, in which.

DETAILED DESCRIPTION

Figure 1:
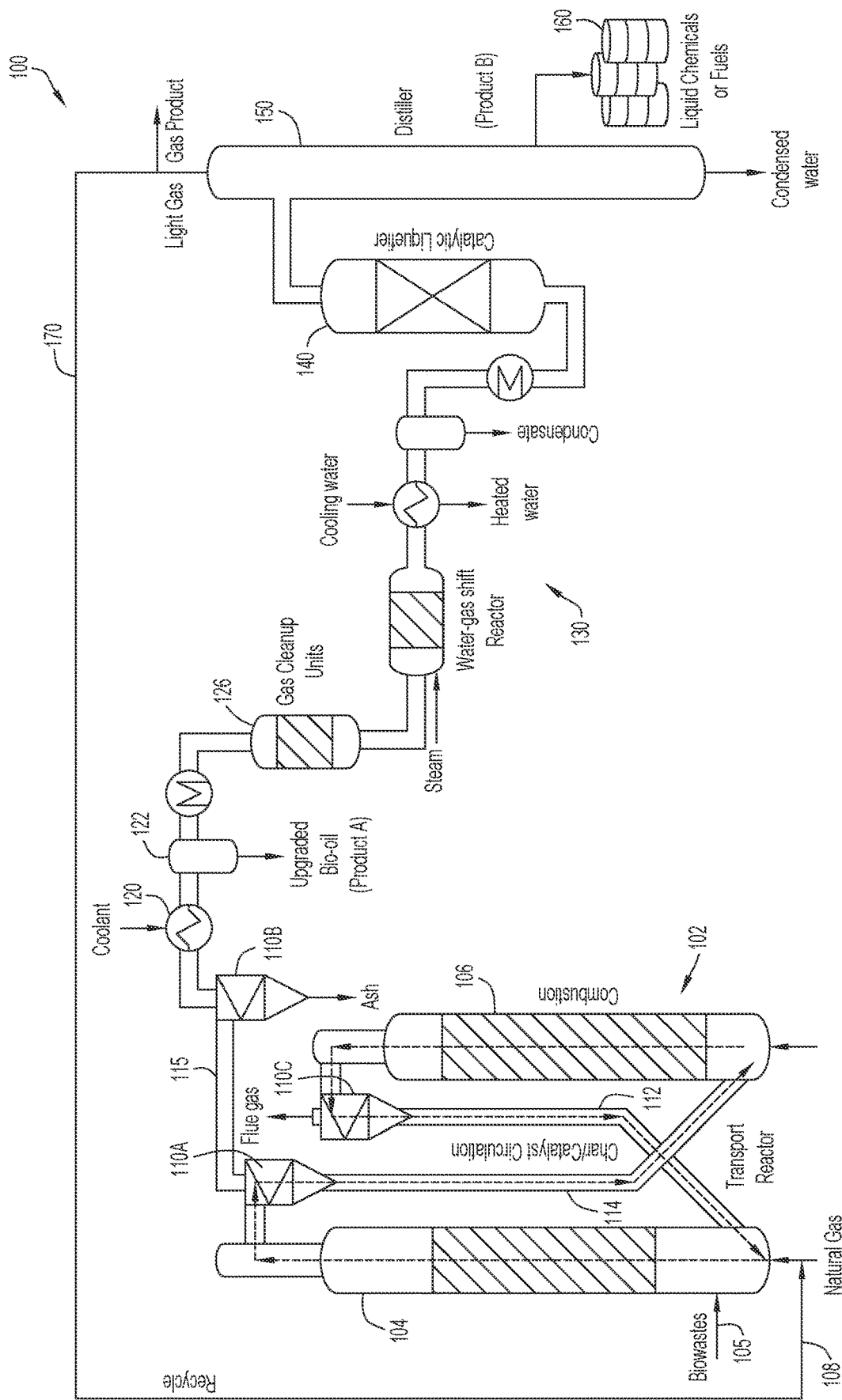
FIG. 1 is a process flow diagram for producing liquid fuel/chemicals from organic solid biomass (bio wastes) in the methane containing gas environment.

The present invention is directed toward the formulation of heterogeneous catalyst structures as well as to processes and systems which utilize the catalyst for organic solid biomass upgrading under a methane or natural gas environment for producing high value-added liquid fuels and/or chemicals without generating negative environmental impact.

In particular, described herein are catalyst structures, systems and methods utilizing such catalyst structures for organic solid biomass (e.g., bio waste) valorization under a methane containing gas environment. It is observed that methane can be effectively activated, which facilitates the methanolysis and liquefaction process for maximizing high value-added liquid fuels and/or chemicals formation with minimized $CO_2$ formation, beneficial for environmental protection. The disclosure provided herein facilitates a transformational way for renewable liquid fuels and/or chemicals production in oil & gas industries.

For example, systems and processes are described herein that simultaneously convert methane rich gas and organic solid biomass, such as solid bio wastes, to valuable liquid chemicals or fuels with minimized formation of ash as filler for the construction industry and flammable gas for residential use. In one broad aspect, systems and processes described herein utilize a catalyst structure to pyrolyze and upgrade organic solid biomass feed stocks (e.g., municipal solid wastes, agricultural and/or residential residues) in a single step using methane containing gas. The methanolysis process combines pyrolysis and upgrading of bio-oils into one step. After proper condensation for upgraded bio-oil collection, the concurrently produced synthetic gas along with unconverted methane containing gas undergo a series of cleanup steps and a water-gas shift reaction to achieve a product having a desirable CO to $H_2$ ratio, followed by a liquefaction step under the facilitation of another catalyst structure to form liquid hydrocarbon products. The process may be conducted at lower pressures (e.g., lower than 5 atm) and with methane containing gas (instead of the costly hydrogen as used in the prior art). The catalyst structures provide high quality performance for triggering methane activation in the presence of other higher hydrocarbons or oxygenates under non-oxidizing conditions. The upgraded bio-oil that is collected can be further upgraded via additional processing as described herein. The systems and processes described herein not only upgrade the quality of organic solid biomass, but may also produce more oil due to the introduction of cheap methane containing gas species.

In the following detailed description, while aspects of the disclosure are disclosed, alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

In accordance with example embodiments, catalyst structures are described herein for use in the combination with processes for organic solid biomass valorization utilizing methane containing resources, e.g., natural gas, biogas, and coal-bed methane, and two or more of such catalyst structures to achieve a liquid product with high quality. A biogas can be produced by conversion of a biomass into gaseous components comprising methane and carbon dioxide. Natural gas also comprises primarily methane, but also can include components such as carbon dioxide and water vapor.

The use of a methane containing gas, rather than hydrogen, in the organic solid biomass valorization process obviates the need for an economically unfavorable hydro treating step at high pressures and temperatures. The design of the catalyst so as to activate methane and selectively form desired products is very important to the efficacy of the process. Particularly, the catalyst structures described herein facilitate the methanolysis and liquefaction processes in the presence of methane rich gas at low temperatures (e.g., in the range of about 350° C. to about 600° C., preferably from about 400° C. to about 500° C., such as at around 400° C.) and pressures (e.g., in the range from about 1 atm to about 10 atm, preferably at about 5 atm) and in the presence catalyst structures.

Solid Biomass for Use in Forming Hydrocarbon Fuel Products

Any suitable solid organic or biomass/bio waste material can be utilized as the starting input or feed material for the processes described herein, in which the organic material is subjected to methanolysis to generate an upgraded bio-oil product as well as further refined/upgraded hydrocarbon fuel products.

Examples of solid organic or solid biomass material that can be used as input to the process include, without limitation, solid bio waste such as municipal waste (e.g., municipal solid waste or MSW) including organic material, lignin based sources including agricultural and/or forestry residues such as corn stover, lignin feed stocks from wood (e.g., wood pellets, woodmill residues, etc.) and/or any other suitable sources of lignin, algae, industrial waste streams including organic material, etc., as well as any other suitable types of biomass material.

Catalyst Structures for Methanolysis

In accordance with the present invention, a methanolysis catalyst structure is provided that comprises one or a combination of mono or multi-metallic (e.g., bimetallic) active components loaded on highly porous supports for organic solid biomass pyrolysis in a methane containing gas environment as described herein (see FIG. 1). It is noted that the catalyst structures described herein can also be used for sulfur removal in other gas environments such as $H_2$, He and $N_2$ environment, although utilizing a methane or natural gas environment is preferred.

The methanolysis catalyst structure can be synthesized by impregnating or doping a suitable support material with two or more metals. A suitably porous support material can be an aluminum oxide (i.e., $Al_2O_3$), an aluminosilicate (e.g. zeolite), and/or a silicon oxide (i.e. $SiO_2$). Some non-limiting examples of a suitable zeolite material as a support material for the catalyst structure include HZSM-5 type zeolite, L-type zeolite, HX type zeolite, HY type zeolite and a zeolite structure commercially available from Rive Technology (Monmouth Junction, New Jersey). An ammonium type zeolite can also be utilized by conversion to a hydrogen type zeolite (e.g., by calcination in static air at a temperature of about 400° C. to about 600° ° C. for a period of about 4 hours to about 6 hours). When utilizing a zeolite material as the support material, a $SiO_2$ to $Al_2O_3$ ratio of the zeolite support material can be in the range of about 2.5 to about 280 (i.e., a ratio of $SiO_2$ to $Al_2O_3$ that is in the range of about 2.5:1 to about 280:1).

Suitable metals that can be loaded on the porous support material by e.g., impregnation or doping, include any one or more (e.g., any two or more) metals selected from the group consisting of molybdenum (Mo), nickel (Ni), cobalt (Co), silver (Ag), gallium (Ga), zinc (Zn), and cerium (Ce). Each metal dopant or the combination of metal dopants can be provided within the catalyst structure in an amount ranging from about 0.1 wt % to about 20 wt % (i.e., based upon the total weight of the catalyst structure). For certain metals, the preferred metal loading is from about 0.1 wt % to about 20 wt %. Specific examples are provided herein of different metal loadings for catalyst structures.

The porous support material can be doped with a suitable amount of one or more metals in the following manner. One or more metal salts can be dissolved in deionized water to form an aqueous solution at suitable concentration(s) within solution. Metal precursor salts that can be used to form the catalyst structure include, without limitation, chlorides, nitrates, sulfates, sulfides and polythiometalates. The one or more metal precursors in solution are then loaded into the porous support material to achieve a desired amount of metals within the catalyst structure (e.g., from about 0.1 wt % to about 20 wt %). Any suitable loading process can be performed to load metals within the porous support material. Some non-limiting examples of metal loading processes include: IWI (incipient wetness impregnation, where an active metal precursor is first dissolved in an aqueous or organic solution, the metal-containing solution is then added to a catalyst support containing the same pore volume as the added solution volume, where capillary action draws the solution into the pores); WI (wet impregnation, where more liquid than the IWI volume is added to the support, and the solvent is then removed by evaporation); IE (ion-exchange, where metal cations are exchanged into the support from solution); and FI (framework incorporation, where metals are added to the support materials during the synthesis step of the support).

Depending upon the particular loading process, the resultant metal loaded catalyst structure can be dried at a temperature between about 80° C. to about 120° C. for a period of time between about 2 hours to about 24 hours. The dried catalyst structure can then be calcined under air, $N_2$ or He gas at a temperature ranging from about 300° C. to about 700° C. and at a suitable ramped or stepwise increased heating rate (e.g., heating rate at about 5° C./min to about 20° C./min), where such calcination temperatures, times and heating rates can be modified depending upon the type or types of metals doped into the catalyst structure as well as reaction conditions associated with the use of the catalyst structure.

The resultant metal doped catalyst structure is suitable for use in organic solid biomass pyrolysis under methane containing gas environment in process as described herein. The catalyst structure can be processed into a granular form with a granule size desired for a particular operation.

Catalyst Structures for Liquefaction (Gas-to-Liquid or GTL)

A liquefaction catalyst structure is present in a dual bed arrangement or dual bed reactor described herein (see FIG. 2) to alter the conventional Fischer-Tropsch (FT) reaction pathway to a new route where a syngas feed stream passes through two consecutive catalyst beds with completely different formulations but operated under the same reaction conditions. A catalyst structure in the first bed is designed to convert syngas to a mixture of light hydrocarbons ($C_1$~$C_4$) along with residue $C_{5+}$ products at near atmospheric pressure and temperature ranging from 350° C. to 450° ° C. The obtained product stream will then be exposed to a catalyst structure in the second bed where liquid products will be maximized under the same reaction conditions based on the synergetic effect between methane and co-existing higher hydrocarbons ($C_{2+}$). The unreacted gas residue can be recycled back to the reactor inlet for the further reaction (optional).

A first liquefaction catalyst structure in the first bed is a slightly modified conventional FT catalyst composed of a mixed metal oxide structure including two or more of $Co_3O_4$, $Fe_2O_3$, NiO and $MnO_2$, and any single alkali metal loaded in the mixed metal oxide structure. The alkali metal loaded in the mixed metal oxide structure is present in an amount from about 0.1 wt % to about 10 wt %.

The first liquefaction catalyst structure can be synthesized by impregnating or doping a suitable support material with a single alkali metal. A suitably mixed metal oxide support material can be made from two or more metal oxides selected from $Co_3O_4$, $Fe_2O_3$, NiO, and $MnO_2$ through co-precipitation: The nitrate precursors of the selected two metals are dissolved in deionized water to provide a transparent aqueous solution. An alkaline solution such as sodium carbonate is then introduced as a precipitation agent into the aqueous solution in a dropwise manner while maintaining a pH of 9 to 10 under agitation. The resulting slurry is vigorously stirred for 0.5 hour to 2 hours. The precipitates are aged at room temperature (e.g., about 25° C. to about 28° C.) for at least 12 hours (e.g., about 12-48 hours) and then filtrated and washed by deionized water several times. The precipitates are dried at about 90° C. to about 105° C. overnight (e.g., a time period from about 6 hours to about 12 hours) and calcined at about 350° C. to about 550° C. at a time period from about 2 hours to about 6 hours. The resulting mixed metal oxide support is then ready for impregnation.

A suitable metal that can be loaded on the support material by impregnation or doping include any single alkali metal (e.g., lithium, sodium, potassium etc.). Each metal dopant or the combination of metal dopants can be provided within the catalyst structure in an amount ranging from about 0.1 wt % to about 10 wt % (i.e., based upon the total weight of the catalyst structure).

The support material can be doped with a suitable amount of one metal in the following manner. One metal salt can be dissolved in deionized water to form an aqueous solution at suitable concentration(s) within solution. Metal precursor salts that can be used to form the catalyst structure include, without limitation, chlorides, nitrates, sulfates, sulfides and polythiometalates. The one metal precursor in solution is then loaded into the support material to achieve a desired amount of metal within the catalyst structure (e.g., from about 0.1 wt % to about 10 wt %). Any suitable loading process can be performed to load metal within the support material. Some non-limiting examples of metal loading processes include: IWI (incipient wetness impregnation, where an active metal precursor is first dissolved in an aqueous or organic solution, the metal-containing solution is then added to a catalyst support containing the same pore volume as the added solution volume, where capillary action draws the solution into the pores); WI (wet impregnation, where more liquid than the IWI volume is added to the support, and the solvent is then removed by evaporation); IE (ion-exchange, where metal cations are exchanged into the support from solution); and FI (framework incorporation, where metal is added to the support material during the synthesis step of the support).

Depending upon the particular loading process, the resultant metal loaded first liquefaction catalyst structure can be dried at a temperature between about 80° C. to about 120° C. for a period of time between about 2 hours to about 24 hours. The dried catalyst structure can then be calcined under air, $N_2$ or He gas at a temperature ranging from about 300° ° C. to about 700° C. and at a suitable ramped or stepwise increased heating rate (e.g., heating rate from about 5° C./min to about 20° C./min), where such calcination temperatures, times and heating rates can be modified depending upon the type or types of metals doped into the catalyst structure as well as reaction conditions associated with the use of the catalyst structure.

The resultant metal doped first catalyst structure is suitable for use in syngas conversion to form $C_1$-$C_4$ light hydrocarbons along with residue $C_{5+}$ products under methane containing gas environment in process as described herein. The first catalyst structure can be processed into a granular form with a granule size desired for a particular operation.

In accordance with the present invention, a second catalyst structure in the second bed is provided that comprises one or the combination of mono or multi-metallic (e.g., bimetallic) active components loaded on highly porous supports for light hydrocarbons liquefaction in a methane containing gas environment.

The second liquefaction catalyst structure can be synthesized by impregnating or doping a suitable support material with two or more metals. A suitably porous support material can be an aluminum oxide (i.e., $Al_2O_3$), an aluminosilicate (e.g. zeolite), and/or a silicon oxide (i.e. $SiO_2$). Some non-limiting examples of a suitable zeolite material as a support material for the catalyst structure include HZSM-5 type zeolite, L-type zeolite, HX type zeolite, HY type zeolite and a zeolite structure commercially available from Rive Technology (Monmouth Junction, New Jersey). An ammonium type zeolite can also be utilized by conversion to a hydrogen type zeolite (e.g., by calcination in static air at a temperature of about 400° C. to about 600° C. for a period of about 4 hours to about 6 hours). When utilizing a zeolite material as the support material, a $SiO_2$ to $Al_2O_3$ ratio of the zeolite support material can be in the range from about 2.5 to about 280 (i.e., a ratio of $SiO_2$ to $Al_2O_3$ that is in the range of 2.5:1 to 280:1).

Suitable metals that can be loaded on the porous support material by impregnation or doping include any one or more (e.g., any two or more) from the following group: molybdenum (Mo), nickel (Ni), cobalt (Co), silver (Ag), gallium (Ga), zinc (Zn), and cerium (Ce). Each metal dopant or the combination of metal dopants can be provided within the second catalyst structure in an amount ranging from about 0.1 wt % to about 20 wt % (i.e., based upon the total weight of the catalyst structure). For certain metals, the preferred metal loading is from about 0.1 wt % to about 20 wt %. Specific examples are provided herein of different metal loadings for second liquefaction catalyst structures.

The porous support material can be doped with a suitable amount of one or more metals in the following manner. One or more metal salts can be dissolved in deionized water to form an aqueous solution at suitable concentration(s) within solution. Metal precursor salts that can be used to form the catalyst structure include, without limitation, chlorides, nitrates, sulfates, sulfides and polythiometalates. The one or more metal precursors in solution are then loaded into the porous support material to achieve a desired amount of metals within the catalyst structure (e.g., from about 0.1 wt % to about 20 wt %). Any suitable loading process can be performed to load metals within the porous support material. Some non-limiting examples of metal loading processes include: IWI (incipient wetness impregnation, where an active metal precursor is first dissolved in an aqueous or organic solution, the metal-containing solution is then added to a catalyst support containing the same pore volume as the added solution volume, where capillary action draws the solution into the pores); WI (wet impregnation, where more liquid than the IWI volume is added to the support, and the solvent is then removed by evaporation); IE (ion-exchange, where metal cations are exchanged into the support from solution); and FI (framework incorporation, where metals are added to the support materials during the synthesis step of the support).

Depending upon the particular loading process, the resultant metal loaded second liquefaction catalyst structure can be dried at a temperature between about 80° C. to about 120° C. for a period of time between about 2 hours to about 24 hours. The dried catalyst structure can then be calcined under air, $N_2$ or He gas at a temperature ranging from about 300° C. to about 700° C. and at a suitable ramped or stepwise increased heating rate (e.g., heating rate from about 5° C./min to about 20° C./min), where such calcination temperatures, times and heating rates can be modified depending upon the type or types of metals doped into the second catalyst structure as well as reaction conditions associated with the use of the second liquefaction catalyst structure.

The resultant metal doped second liquefaction catalyst structure is suitable for use in light hydrocarbons liquefaction under methane containing gas environment in process as described herein. The second liquefaction catalyst structure can be processed into a granular form with a granule size desired for a particular operation.

Systems and Methods for Organic Solid Biomass Valorization Under Methane Containing Gas Environment Utilizing the Catalyst Structures A system 100 is depicted in FIG. 1 including a methanolysis reaction system 102 that comprises a plurality of container units or vessels including a methanolysis reaction zone 104, a regeneration zone 106, and a plurality of gas cyclone units 110A, 110B, 110C. A biomass comprising bio waste stream 105 including bio waste material and a supply 108 of methane (e.g., natural gas) are input into the reaction zone 104 to facilitate gasification and pyrolysis (methanolysis) within the reaction zone with the presence of the methanolysis catalyst structure provided within the reaction zone. The methanolysis catalyst structure circulates between the reaction zone 104 and the regeneration zone 106 via circulation line 112 (extending from an outlet of the regeneration zone to an inlet of the reaction zone) and circulation line 114 (extending from an outlet of the reaction zone to an inlet of the regeneration zone), where combustion of material within the regeneration zone facilitates regeneration of the methanolysis catalyst structure prior to being circulated back to the reaction zone. In addition, output material flowing from the regeneration zone to the reaction zone facilitates further heat transfer to the reaction zone.

The reaction zone 104 operates under a methane/natural gas environment at a temperature ranging from about 400° C. to about 500° C. The gas products formed within the reaction zone emerge or are output from the reaction zone and are separated from solid particles containing catalyst and biochar in the first cyclone unit 110A. The produced ash fine that is carried out by the product gas stream in a flow line 115 exiting the first cyclone unit 110A can be separated from the product gas stream in the second cyclone unit 110B. This allows for pretreated bio wastes to be continuously fed into the reactor system with continuous ash removal. Circulation line 114 provides output solid material (including the methanolysis catalyst structure) from the first cyclone unit 110A as an input to the regeneration zone 106.

At the regeneration zone 106, air is also input with the solids output from the cyclone unit 110A to facilitate combustion within the regeneration zone that fully oxidizes formed char entrained from the reaction zone 104 by the methanolysis catalyst structure for generating heat to compensate the energy requirement from the endothermic gasification/pyrolysis reaction within the reaction zone, leading to minimized external energy input required for the reaction zone. The circulated methanolysis catalyst structure can also get refreshed through such air introduction in the event coke has become deposited on its surface (during the pyrolysis/gasification process). In other words, any coke or other carbonaceous material formed over surface portions of the methanolysis catalyst structure can be removed by the oxidation process. This is beneficial for longevity/lifetime extension/continuous re-use of the methanolysis catalyst structure. The regenerated methanolysis catalyst structure (which also serves as a heater carrier) is transported from the regeneration zone 106 and is separated from formed flue gas in the third cyclone unit 110C, where it is then recycled back via circulation line 112 to the reaction zone 104 for triggering next cycle pyrolysis/gasification of the input bio waste material.

The product gas stream emerging from the second cyclone unit 110B is provided to a condenser unit 120 to form an upgraded liquid bio-oil product (also referred to herein as Product A) from the gaseous products which include a synthetic gas (syngas) and any unreacted natural gas. The liquid bio-oil product/Product A is separated from the syngas in a separation unit 122, where the Product A can then be collected for further processing at another section. The syngas and unreacted/unconverted natural gas exiting the separation unit 122 can undergo a series of conventional cleanup steps (e.g., a series of units for $H_2S$, $NH_3$, HCl, and heavy metals removal) at a clean-up unit section 126.

The processed syngas exiting the clean-up unit section 126 can next be delivered, along with a supply of steam, to a reactor section 130 that subjects the syngas to a water-gas shift reaction so as to achieve a desirable CO to $H_2$ ratio for the gas product, where non-converted $H_2O$ can then be removed from the syngas as condensate.

The processed syngas exiting the clean-up unit section 126 is input to a liquefaction reaction system comprising a catalytic liquefaction or gas-to-liquid (GTL) unit 140, where the syngas is subjected to a liquefaction process in the presence of a plurality of liquefaction catalyst structures where syngas is first converted to a mixture of light hydrocarbons and then forms liquid hydrocarbon products based on a synergetic effect existing between methane and higher hydrocarbons at temperatures ranging from about 350° C. to about 450° ° C.

Figure 2:
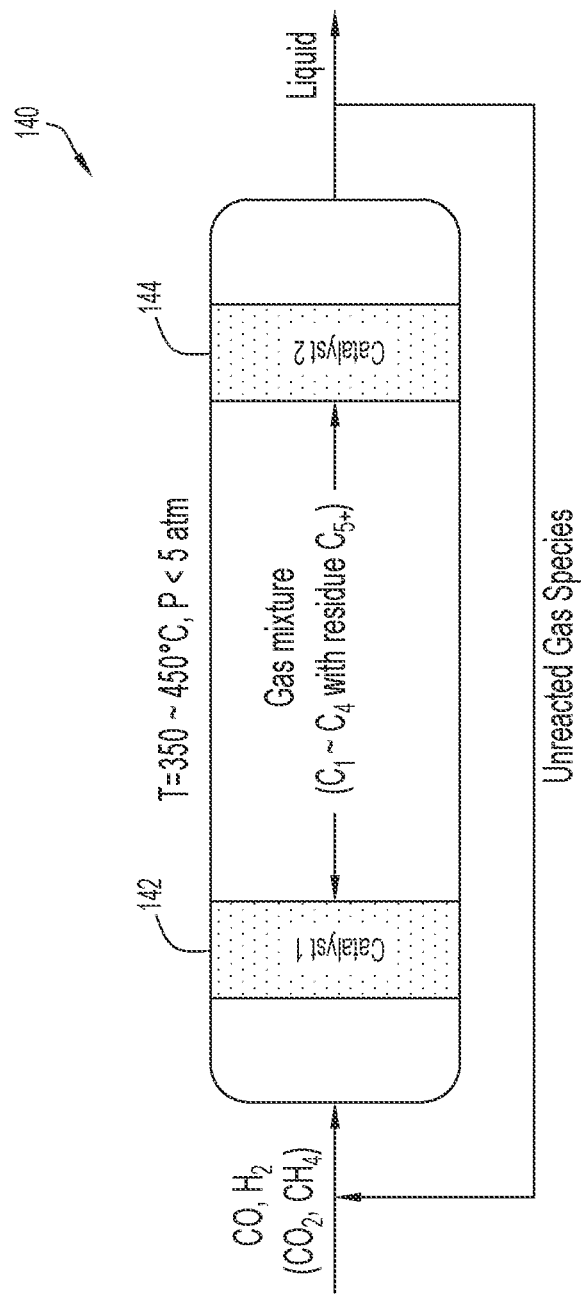
FIG. 2 is a schematic diagram of a dual bed reactor configuration for syngas liquefaction at near atmospheric pressure.

Referring to FIG. 2, the GTL unit 140 includes a dual bed reactor comprising a first catalyst bed 142 that includes the first liquefaction catalyst structure as previously described herein and a second catalyst bed 144 that includes the second liquefaction catalyst structure as previously described herein. Each of the first and second liquefaction catalyst structures can be provided in granular form at any suitable particle sizes or particle size range as deemed suitable for the reaction process. As noted, the GTL unit 140 operates at a temperature ranging from about 350° C. to about 450° C. In addition, the GTL unit 140 can operate at low pressures at or near atmospheric pressure (e.g., an operating pressure of no greater than about 5 atm). The syngas feed stream (comprising $H_2$, CO, $CO_2$ and $CH_4$) is delivered through the GTL unit 140, where it encounters the first catalyst bed 142 followed by the second catalyst bed 144. As previously noted herein, the consecutively arranged first and second catalyst beds include significantly different catalyst structures but can be operated under the same or substantially similar reaction conditions. The first liquefaction catalyst structure in the first catalyst bed 142 facilitates conversion of the syngas to a mixture of light hydrocarbons (e.g., $C_1$-$C_4$ range, with residue components comprising $C_{5+}$). The product stream passing the first catalyst bed 142 is then exposed to the second catalyst bed 144 within the GTL unit 140 under the same reaction conditions as the first catalyst bed, resulting in liquefaction of at least some of the gaseous components under the methane gas environment so as to form liquid hydrocarbon products. Upon exiting the GTL unit 140, unreacted gas species can be separated from the liquid hydrocarbon products and recycled back to the inlet of the GTL unit 140 for further reaction.

The liquid hydrocarbon products can be further processed in a separation or distillation unit 150 so as to isolate and collect liquid fuel products of interest (also referred to herein as Product B) at section 160. Condensed water can be removed from products as well as gaseous hydrocarbon products including methane/natural gas. The methane/natural gas can be recycled from the distillation unit 150, via recycle line 170, back to the transport reactor system 102 where it is mixed with the input methane/natural gas to the reaction zone 104.

The system and associated method of FIG. 1 facilitates the conversion of organic solid biomass and selectivity towards valuable liquid hydrocarbon products which can further be fine-tuned using catalyst structures as described herein and under a methane containing environment. Different reactor systems and modified operating conditions (e.g., temperatures and pressures) as well as modifications of the catalyst structures within the reactor systems can also be implemented to achieve varied product compositions.

Methane, as a main component in natural gas, is particularly useful for conversion of organic solid biomass in the presence of the catalyst structures described herein. Methane is typically regarded as chemically inert due to its stable structure, and methane activation has been a challenge in natural gas utilization. However, in accordance with the invention as described herein, methane utilization in the valorization of biomass material can be significantly enhanced with the assistance of the aforementioned catalyst structures, systems and corresponding methods.

The organic solid biomass conversion utilizing the described catalyst structures, systems and methods as described herein further minimize the generation of $CO_2$. In particular, methane activation and incorporation utilizing the catalyst structures as described herein can result in the generation or production of $CO_2$ that is less than 5% by weight of the oil product, in some scenarios less than 3% by weight, or even less than 1% by weight (e.g., substantially no $CO_2$ is formed in the process).

Figure 3:
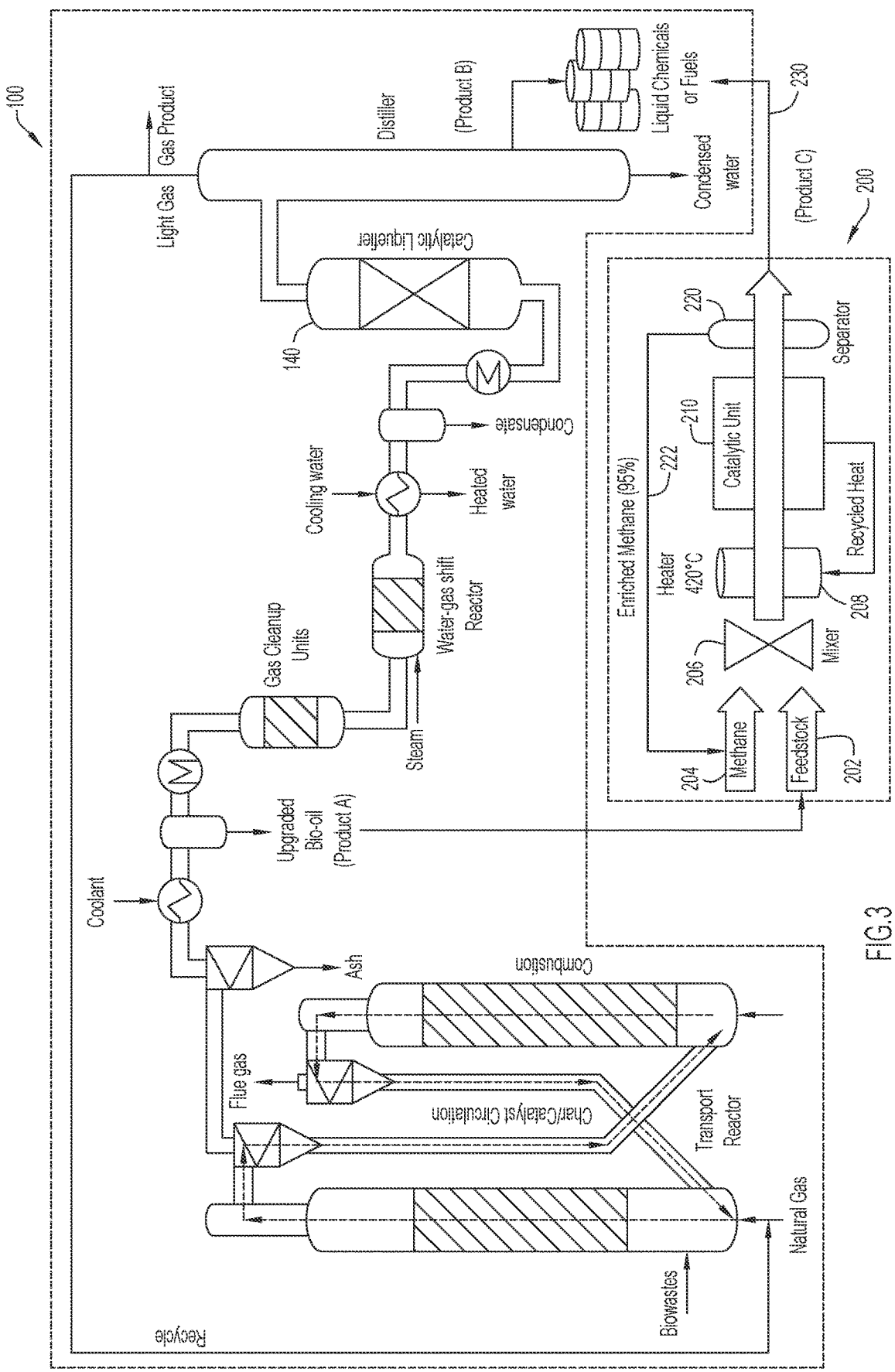
FIG. 3 is a process flow diagram including the configuration of FIG. 1 and an additional process flow for converting the upgraded bio-oil to a liquid bio fuel product.

In a further embodiment depicted in FIG. 3, the system of FIG. 1 has been modified to include a further hydrocarbon upgrading system that processes the upgraded bio-oil product (Product A) into a refined/further upgraded light oil product. For example, the upgraded light oil product can have properties such as a viscosity and an oxygen content that are lower than that of the bio-oil product. The upgrading process for the bio-oil can be carried out utilizing a process as described in U.S. patent application Ser. No. 16/792,574, the contents of which are incorporated herein by reference in its entirety. In particular, Product A, exiting as a liquid from separation unit 122 of system 100, can be provided to a hydrocarbon upgrading system 200 for upgrading of the bio-oil to a light oil fuel product (also referred to herein as Product C). A source 202 of feedstock including Product A along with a source 204 of methane (e.g., natural gas or other hydrocarbon source comprising about 95% by weight methane) are provided as inputs to system 200 and are combined in a mixing unit 206 and heated in a heater unit 208 to a suitable temperature (e.g., from about 350° C. to about 450° C., such as about 420 °C) prior to being delivered to a catalytic reactor 210.

The catalytic reactor 210 includes a catalyst bed with a fixed catalyst structure. The catalyst structure of reactor 210 comprises a suitable porous support material impregnated or doped with two or more metals (e.g., utilizing process such as wet impregnation or ion exchange to adsorb metal ions to the porous surfaces of the support material). A suitably porous support material can be an aluminum oxide material (e.g., $Al_2O_3$), an aluminosilicate (zeolite) material, or a zirconium oxide material (e.g., $ZrO_2$). Some non-limiting examples of a suitable zeolite material for use as a support material for the catalyst structure include a ZSM-5 type zeolite (e.g., HZSM-5 zeolite, NaZSM-5 zeolite, etc.), A-type zeolite, L-type zeolite, HY type zeolite and a zeolite structure commercially available from Rive Technology (Monmouth Junction, New Jersey). An ammonium type zeolite can also be utilized by conversion to a hydrogen type zeolite (e.g., by calcination in static air at a temperature of about 400° C. to about 600° C. for a period from about 4 hours to about 6 hours). When utilizing a zeolite material as the support material, a $SiO_2$ to $Al_2O_3$ ratio of the zeolite support material can be in the range of about 1 to about 280 (i.e., a ratio of $SiO_2$ to $Al_2O_3$ that is 1:1 to 280:1), such as a range of 5-28, or a range of 23-280. The zeolite material can further have a BET surface area in the range from about 350 $m^2$/g to about 950 $m^2$/g. The support materials can optionally be modified with phosphorus prior to being synthesized into a suitable catalyst structure.

Suitable metals that can be used to dope the porous support material include any one or more (and preferably any two or more) of gallium (Ga), silver (Ag), zinc (Zn), molybdenum (Mo), cobalt (Co) and cerium (Ce). Each metal dopant or the combination of metal dopants can be provided within the catalyst structure (e.g., in metal or metal oxide form) in an amount ranging from about 0.1 to about 20 wt % (i.e., based upon the total weight of the catalyst structure). For certain metals, such as Ag and Ga, the preferred metal loading is from about 0.2 wt % to about 2 wt %. For other metals, such as Co, the preferred metal loading is from about 0.3 wt % to about 3 wt %. Formation of the catalyst support structure by doping or impregnating a porous support structure with one or more metals and at the desired weight percentages as described herein can be achieved in a similar manner as other types of catalyst structures described herein that are formed with similar porous support structures. In addition, the catalyst support structure for the reactor 210 can be converted into pellets or provided in powder or granular form. Further, the catalyst structure can be regenerated, either before or after a period of time of its use in upgrading hydrocarbons of the feedstock 202, to enhance the performance of the catalyst structure. The regeneration process comprises rinsing the catalyst with toluene, drying in air to remove toluene (e.g., drying at about 100° C. to about 200° C., e.g., about 150° C., for at least 1 hour, e.g., about 3 hours or greater) and calcination (heating in air) at a temperature of at least about 500° C. (e.g., about 600° C. or greater) for a sufficient period of time, e.g., at least about 3 hours (e.g., about 5 hours or greater). The regeneration process can also be repeated any number of times and depending upon a particular application.

The bio-oil (Product A) is converted to a light fuel oil product (Product C) in the presence of the catalyst structure within the catalytic reactor 210. The output from the reactor 210 is delivered to a separator 220 which separates the light fuel oil (Product C) from gaseous components including unreacted methane. The gaseous components can be recycled, via line 222, back to the input to the mixing unit 206, while the light fuel oil (Product C) can be collected at 230.

Thus, three upgraded hydrocarbon products are formed in the process of FIG. 3, specifically: the upgraded bio-oil (Product A), the light hydrocarbon products (Product B) formed in a GTL (gas to liquids) process from syngas that was separated from the upgraded bio-oil, and a light fuel oil (Product C) formed via the upgrading of the bio-oil (Product A) reacted with methane.

Example #1

A process using the system of FIG. 3 was performed to form the bio-oil product (Product A) from solid bio waste (or other biomass) material and the light fuel oil (Product C) from upgrading the bio-oil. The products were obtained by running the methanolysis process (within reaction zone 104 of the transport reaction system 102) to form Product A continuously for 60 days, and running the system 200 for forming Product C continuously for 30 days.

The catalyst structure used for methanolysis to form the bio-oil (Product A) in reaction zone 104 was 1 wt % Ga-5 wt % Zn-10 wt % Ce/HZSM-5 (80:1), while the catalyst structure used for converting the bio-oil (Product A) to the light fuel oil product (Product C) in the reactor 210 was 1 wt % Ag-1 wt % Ga-2 wt % Co-6 wt % Mo-10 wt % Ce/HZSM-5 (80:1). The solid organic biomass material fed to the reaction zone 104 was wood chip.

In the methanolysis process (forming Product A), the conditions in reaction zone 104 were as follows:
Reaction temperature: 400° C.
Reaction pressure: 10-15 psig (0.68-1.02 atm)
Biomass feed rate: 70 g/min
Gas flow rate: 2 m³/min
Catalyst load: 35 kg
Overall mass balance: 96 wt %
Char yield: 30 wt %
Gas yield: 10 wt %
Liquid yield: 56 wt % (water rich liquid phase yield: 23 wt %; oil rich liquid phase yield: 33 wt %)

In the fixed bed upgrading process under methane (forming Product C), the process conditions were as follows:
Reaction temperature: 400° C.
Reaction pressure: 50 bar (49.3 atm)
WHSV (weight hour space velocity): 1 hr$^{-1}$
Liquid yield: 99 wt %

Characterization for each of the bio-oil (Product A) and the light fuel oil (Product C) formed from the process under the noted process conditions is set forth as follows:

TABLE 1

| Product A (bio-oil) characterization | |
| --- | --- |
| Physical property | Value |
| Kinematic Viscosity (40° C.) | 47.38 mm²/s |
| Kinematic Viscosity (100° C.) | 7.024 mm²/s |
| Viscosity index | 105 |
| Flash point (open cup) | 221° C. |
| Density (20° C.) | 841.2 kg/m³ |
| TAN | 0.15 mg KOH/g |
| Cetane Number | 22 |
| Organic chlorine content | <1.0 mg/kg |
| Freezing point | −21° C. |
| Pour point | −15° C. |

| Boiling range | Temperature (° C.) |
| --- | --- |
| Initial boiling point (0.5 weight percent) | 233.0 |
| With 2% mass recovery | 304.0 |
| With 5% mass recovery | 364.0 |
| With 10% mass recovery | 389.5 |
| With 20% mass recovery | 416.0 |
| With 30% mass recovery | 433.0 |
| With 40% mass recovery | 447.5 |
| With 50% mass recovery | 460.0 |
| With 60% mass recovery | 471.0 |
| With 70% mass recovery | 482.5 |
| With 80% mass recovery | 493.0 |
| With 90% mass recovery | 508.0 |
| With 95% mass recovery | 519.0 |
| With 98% mass recovery | 531.5 |
| With 99.5% mass recovery | >545.0 |

| Component content | Amount (weight percent) |
| --- | --- |
| Saturated hydrocarbons | 84.49 |
| Aromatic hydrocarbons | 14.21 |
| Polar components (Resin + Asphaltene) | 1.30 |
| Water | 0.025 |
| Nitrogen | 0.21 |
| Oxygen | 3.41 |
| Sulfur | 1.32 |
| Carbon residue | 0.10 |
| Ash content | 0.01 |

| Elemental Analysis (element present) | Amount (mg/kg) |
| --- | --- |
| Ca | 9.1 |
| K | 13.2 |
| Na | 6.5 |
| Mg | 14.4 |
| P | 15.6 |

TABLE 2

| Product C (light fuel oil) characterization | |
| --- | --- |
| Physical property | Value |
| Kinematic Viscosity (40° C.) | 7.736 mm²/s |
| Kinematic Viscosity (100° C.) | 2.475 mm²/s |
| Viscosity index | 161 |
| Flash point (open cup) | 112° C. |
| Density (20° C.) | 844.8 kg/m³ |
| TAN | 0.01 mg KOH/g |
| Cetane Number | 52 |
| Organic chlorine content | <1.0 mg/kg |
| Freezing point | −32° C. |
| Pour point | −26° C. |

| Boiling range | Temperature (° C.) |
| --- | --- |
| Initial boiling point (0.5 weight percent) | 121.5 |
| With 2% mass recovery | 152.0 |
| With 5% mass recovery | 181.0 |
| With 10% mass recovery | 213.5 |
| With 20% mass recovery | 235.0 |
| With 30% mass recovery | 253.5 |
| With 40% mass recovery | 267.5 |
| With 50% mass recovery | 281.5 |
| With 60% mass recovery | 316.0 |

TABLE 2-continued

Product C (light fuel oil) characterization

| | |
|---|---|
| With 70% mass recovery | 334.0 |
| With 80% mass recovery | 347.5 |
| With 90% mass recovery | 360.0 |
| With 95% mass recovery | 387.5 |
| With 98% mass recovery | 401.5 |
| With 99.5% mass recovery | 405.0 |

| Component content | Amount (weight percent) |
|---|---|
| Saturated hydrocarbons | 74.47 |
| Aromatic hydrocarbons | 25.51 |
| Polar components (Resin + Asphaltene) | 0.02 |
| Water | Trace amount |
| Nitrogen | 0.0052 |
| Oxygen | 0.07 |
| Sulfur | 0.210 |
| Carbon residue | 0.07 |
| Ash content | 0.008 |

| Elemental Analysis (element present) | Amount (mg/kg) |
|---|---|
| Ca | 4.2 |
| K | 3.2 |
| Na | 2.4 |
| Mg | 6.1 |
| P | 8.7 |

Example #2

A process using the system of FIG. 3 was performed to form the bio-oil product (Product A) from solid bio waste material and the light fuel oil (Product C) from upgrading the bio-oil. The products were obtained by running the methanolysis process (within reaction zone 104 of the transport reaction system 102) to form Product A continuously for 30 days, and running the system 200 for forming Product C continuously for 30 days.

The catalyst structure used for methanolysis to form the bio-oil (Product A) in reaction zone 104 was 1 wt % Ga-5 wt % Zn-10 wt % Ce/HZSM-5 (80:1), while the catalyst structure used for converting the bio-oil (Product A) to the light fuel oil product (Product C) in the reactor 210 was 1 wt % Ag-1 wt % Ga-2 wt % Co-6 wt % Mo-10 wt % Ce/HZSM-5 (80:1). The solid organic biomass material fed to the reaction zone 104 was rice straw.

In the methanolysis process (forming Product A), the conditions in reaction zone 104 were as follows:
  Reaction temperature: 400° ° C.
  Reaction pressure: 10-15 psig (0.68-1.02 atm)
  Biomass feed rate: 70 g/min
  Gas flow rate: 2 m³/min
  Catalyst load: 35 kg
  Overall mass balance: 96 wt %
  Char yield: 43 wt %
  Gas yield: 15 wt %
  Liquid yield: 38 wt % (water rich liquid phase yield: 21 wt %; oil rich liquid phase yield: 17 wt %)

In the fixed bed upgrading process under methane (forming Product C), the process conditions were as follows:
  Reaction temperature: 400° C.
  Reaction pressure: 50 bar (49.3 atm)
  WHSV (weight hour space velocity): 1 hr$^{-1}$
  Liquid yield: 97.5 wt %

Characterization for each of the bio-oil (Product A) and the light fuel oil (Product C) formed from the process under the noted process conditions is set forth as follows:

TABLE 3

Product A (bio-oil) characterization

| Physical property | Value |
|---|---|
| Kinematic Viscosity (40° C.) | 38.67 mm²/s |
| Kinematic Viscosity (100° C.) | 5.512 mm²/s |
| Viscosity index | 101 |
| Flash point (open cup) | 205° C. |
| Density (20° C.) | 846.7 kg/m³ |
| TAN | 0.12 mg KOH/g |
| Cetane Number | 25 |
| Organic chlorine content | <1.0 mg/kg |
| Freezing point | −27° C. |
| Pour point | −18° C. |

| Boiling range | Temperature (° C.) |
|---|---|
| Initial boiling point (0.5 weight percent) | 221.0 |
| With 2% mass recovery | 288.5 |
| With 5% mass recovery | 347.5 |
| With 10% mass recovery | 372.0 |
| With 20% mass recovery | 398.5 |
| With 30% mass recovery | 415.5 |
| With 40% mass recovery | 429.0 |
| With 50% mass recovery | 443.5 |
| With 60% mass recovery | 454.0 |
| With 70% mass recovery | 465.5 |
| With 80% mass recovery | 475.5 |
| With 90% mass recovery | 491.0 |
| With 95% mass recovery | 503.5 |
| With 98% mass recovery | 516.5 |
| With 99.5% mass recovery | >530.0 |

| Component content | Amount (weight percent) |
|---|---|
| Saturated hydrocarbons | 82.34 |
| Aromatic hydrocarbons | 16.21 |
| Polar components (Resin + Asphaltene) | 0.85 |
| Water | 0.21 |
| Nitrogen | 0.18 |
| Oxygen | 7.32 |
| Sulfur | 0.13 |
| Carbon residue | 0.15 |
| Ash content | 0.02 |

| Elemental Analysis (element present) | Amount (mg/kg) |
|---|---|
| Ca | 5.2 |
| K | 28.1 |
| Na | 15.3 |
| Mg | 26.2 |
| P | 14.3 |

TABLE 4

Product C (light fuel oil) characterization

| Physical property | Value |
|---|---|
| Kinematic Viscosity (40° C.) | 6.238 mm²/s |
| Kinematic Viscosity (100° C.) | 1.074 mm²/s |
| Viscosity index | 158 |
| Flash point (open cup) | 95° C. |
| Density (20° C.) | 848.9 kg/m³ |
| TAN | 0.01 mg KOH/g |
| Cetane Number | 53 |
| Organic chlorine content | <1.0 mg/kg |
| Freezing point | −38° C. |
| Pour point | −30° C. |

| Boiling range | Temperature (° C.) |
|---|---|
| Initial boiling point (0.5 weight percent) | 108.5 |
| With 2% mass recovery | 137.5 |
| With 5% mass recovery | 168.5 |
| With 10% mass recovery | 205.0 |
| With 20% mass recovery | 221.5 |

TABLE 4-continued

Product C (light fuel oil) characterization

| | |
|---|---|
| With 30% mass recovery | 239.0 |
| With 40% mass recovery | 251.5 |
| With 50% mass recovery | 269.0 |
| With 60% mass recovery | 309.5 |
| With 70% mass recovery | 323.0 |
| With 80% mass recovery | 336.5 |
| With 90% mass recovery | 349.5 |
| With 95% mass recovery | 375.0 |
| With 98% mass recovery | 391.5 |
| With 99.5% mass recovery | 401.0 |

| Component content | Amount (weight percent) |
|---|---|
| Saturated hydrocarbons | 70.92 |
| Aromatic hydrocarbons | 29.07 |
| Polar components (Resin + Asphaltene) | 0.01 |
| Water | Trace amount |
| Nitrogen | 0.0034 |
| Oxygen | 0.05 |
| Sulfur | 0.06 |
| Carbon residue | 0.09 |
| Ash content | 0.005 |

| Elemental Analysis (element present) | Amount (mg/kg) |
|---|---|
| Ca | 3.1 |
| K | 2.8 |
| Na | 1.6 |
| Mg | 4.8 |
| P | 3.3 |

Example #3

A process using the system of FIG. 3 was performed to form the bio-oil product (Product A) from solid bio waste material and the light fuel oil (Product C) from upgrading the bio-oil. The products were obtained by running the methanolysis process (within reaction zone 104 of the transport reaction system 102) to form Product A continuously for 30 days, and running the system 200 for forming Product C continuously for 30 days.

The catalyst structure used for methanolysis to form the bio-oil (Product A) in reaction zone 104 was 1 wt % Ga-5 wt % Zn-10 wt % Ce/HZSM-5 (80:1), while the catalyst structure used for converting the bio-oil (Product A) to the light fuel oil product (Product C) in the reactor 210 was 1 wt % Ag-1 wt % Ga-2 wt % Co-6 wt % Mo-10 wt % Ce/HZSM-5 (80:1). The solid organic biomass material fed to the reaction zone 104 was corn stover.

In the methanolysis process (forming Product A), the conditions in reaction zone 104 were as follows:
Reaction temperature: 400° C.
Reaction pressure: 10-15 psig (0.68-1.02 atm)
Biomass feed rate: 70 g/min
Gas flow rate: 2 m$^3$/min
Catalyst load: 35 kg
Overall mass balance: 96.5 wt %
Char yield: 23.5 wt %
Gas yield: 13.5 wt %
Liquid yield: 59.5 wt % (water rich liquid phase yield: 28 wt %; oil rich liquid phase yield: 31.5 wt %)

In the fixed bed upgrading process under methane (forming Product C), the process conditions were as follows:
Reaction temperature: 400° ° C.
Reaction pressure: 50 bar (49.3 atm)
WHSV (weight hour space velocity): 1 hr$^{-1}$
Liquid yield: 97 wt %

Characterization for each of the bio-oil (Product A) and the light fuel oil (Product C) formed from the process under the noted process conditions is set forth as follows:

TABLE 5

Product A (bio-oil) characterization

| Physical property | Value |
|---|---|
| Kinematic Viscosity (40° C.) | 84.23 mm$^2$/s |
| Kinematic Viscosity (100° C.) | 7.718 mm$^2$/s |
| Viscosity index | 25 |
| Flash point (open cup) | 236° C. |
| Density (20° C.) | 948.6 kg/m$^3$ |
| TAN | 13.8 mg KOH/g |
| Cetane Number | 21 |
| Organic chlorine content | <1.0 mg/kg |
| Freezing point | 4° C. |
| Pour point | 6° C. |

| Boiling range | Temperature (° C.) |
|---|---|
| Initial boiling point (0.5 weight percent) | 258.5 |
| With 2% mass recovery | 281.5 |
| With 5% mass recovery | 323.0 |
| With 10% mass recovery | 354.5 |
| With 20% mass recovery | 377.5 |
| With 30% mass recovery | 399.0 |
| With 40% mass recovery | 421.0 |
| With 50% mass recovery | 449.5 |
| With 60% mass recovery | 468.0 |
| With 70% mass recovery | 485.5 |
| With 80% mass recovery | 509.5 |
| With 90% mass recovery | 530.0 |
| With 95% mass recovery | 553.0 |
| With 98% mass recovery | 576.5 |
| With 99.5% mass recovery | >600.0 |

| Component content | Amount (weight percent) |
|---|---|
| Saturated hydrocarbons | 82.34 |
| Aromatic hydrocarbons | 16.21 |
| Polar components (Resin + Asphaltene) | 0.85 |
| Water | 1.28 |
| Nitrogen | 0.17 |
| Oxygen | 10.6 |
| Sulfur | 0.38 |
| Carbon residue | 0.32 |
| Ash content | 0.18 |

| Elemental Analysis (element present) | Amount (mg/kg) |
|---|---|
| Ca | 19.3 |
| K | 35.9 |
| Na | 15.3 |
| Mg | 13.3 |
| P | 9.4 |

TABLE 6

Product C (light fuel oil) characterization

| Physical property | Value |
|---|---|
| Kinematic Viscosity (40° C.) | 8.036 mm$^2$/s |
| Kinematic Viscosity (100° C.) | 2.587 mm$^2$/s |
| Viscosity index | 174 |
| Flash point (open cup) | 101° C. |
| Density (20° C.) | 857.3 kg/m$^3$ |
| TAN | 0.01 mg KOH/g |
| Cetane Number | 51 |
| Organic chlorine content | <1.0 mg/kg |
| Freezing point | −19° C. |
| Pour point | −15° C. |

TABLE 6-continued

Product C (light fuel oil) characterization

| Boiling range | Temperature (° C.) |
|---|---|
| Initial boiling point (0.5 weight percent) | 119.5 |
| With 2% mass recovery | 148.5 |
| With 5% mass recovery | 179.5 |
| With 10% mass recovery | 218.0 |
| With 20% mass recovery | 239.5 |
| With 30% mass recovery | 258.5 |
| With 40% mass recovery | 279.0 |
| With 50% mass recovery | 298.0 |
| With 60% mass recovery | 317.5 |
| With 70% mass recovery | 331.0 |
| With 80% mass recovery | 351.5 |
| With 90% mass recovery | 368.5 |
| With 95% mass recovery | 386.0 |
| With 98% mass recovery | 401.5 |
| With 99.5% mass recovery | 425.0 |

| Component content | Amount (weight percent) |
|---|---|
| Saturated hydrocarbons | 74.87 |
| Aromatic hydrocarbons | 25.12 |
| Polar components (Resin + Asphaltene) | 0.01 |
| Water | Trace amount |
| Nitrogen | 0.0057 |
| Oxygen | 0.04 |
| Sulfur | 0.08 |
| Carbon residue | 0.12 |
| Ash content | 0.001 |

| Elemental Analysis (element present) | Amount (mg/kg) |
|---|---|
| Ca | 5.8 |
| K | 7.9 |
| Na | 1.8 |
| Mg | 1.6 |
| P | 2.1 |

Each of the upgraded hydrocarbon products (Products A, B and C) have much lower oxygen content, much lower moisture (water) content and lower viscosity in relation to conventional bio-oil or fuel oil products. With regard to Product A and Product C, the upgrading of Product A to form Product C can result in an upgraded bio fuel having a lower viscosity, a lower sulfur content, a lower oxygen content, a lower TAN value, lower water content, as well as other enhanced properties in relation to the bio oil prior to upgrading. Product B can be formed from synthetic gas as a light hydrocarbon product (e.g., a light oil such as a diesel oil product) having a dynamic viscosity less than $2 \times 10^3$ cP (mPa·s).

The upgrading process of the hydrocarbon products results in a change in one or more properties in the hydrocarbon products. The change (from first hydrocarbon product to upgraded, second hydrocarbon product) to one or more properties in the hydrocarbon product include, without limitation, change (decrease) in density, change (decrease) in viscosity, change (decrease) in sulfur content, change (decrease) in TAN (total acid number), change (decrease) in an amount (e.g., weight percentage) of olefins, change (decrease) in an amount (e.g., weight percentage) of nitrogen, change (decrease) in pour point, change (increase) in an amount (e.g., weight percentage) of one or more aromatic hydrocarbons, change (increase) in the hydrogen to carbon ratio (H/C ratio), and change (increase) in cetane number.

Thus, the processes and systems described herein, including selection of various different catalyst structures used in in the reactors for forming each of the upgraded hydrocarbon products, facilitate a wide variety of solid organic or biomass/bio waste input feed stocks that can be used which further facilitate generation of enhanced hydrocarbon products for a wide variety of uses.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed:

1. A method for the valorization of an organic solid biomass feedstock for liquid fuel and/or chemical productions, the method comprising:
   introducing an organic solid biomass feedstock into a reaction zone of a pyrolysis reaction system in presence of methane and a pyrolysis catalyst structure to convert the organic solid biomass feedstock to a liquid bio-oil product and a synthetic gas product, wherein the pyrolysis catalyst structure comprises a porous support structure including one or more of an aluminum oxide, an aluminosilicate material, and a silicon oxide, and a plurality of metals loaded in the porous support structure, the plurality of metals consisting of Ga, Ce and Zn;
   circulating the pyrolysis catalyst structure between the reaction zone and a regeneration zone, wherein carbonaceous material deposited on the pyrolysis catalyst structure is oxidized and removed from the pyrolysis catalyst structure within the regeneration zone to form a regenerated pyrolysis catalyst structure, and the regenerated pyrolysis catalyst structure is directed from the regeneration zone to the reaction zone;
   introducing the synthetic gas product into a liquefaction reaction system in presence of a second gas and a liquefaction catalyst structure to convert the synthetic gas product to a liquid oil product; and
   providing a gaseous product exiting the liquefaction reaction system as an input to the pyrolysis reaction system.

2. The method of claim 1, wherein a temperature within the pyrolysis reaction system is from about 400° C. to about 500° C., and a pressure within the pyrolysis reaction system is from about 1 atm to about 10 atm.

3. The method of claim 1, wherein the organic solid biomass feedstock comprises one or more of a municipal solid waste, and an agricultural and/or forestry solid waste residue.

4. The method of claim 1, wherein the methane is provided in a methane-containing gas that comprises one or more of a biogas and a natural gas.

5. The method of claim 1, wherein the methane is provided in a methane-containing gas further comprising one or more of nitrogen, helium, carbon dioxide and water.

6. The method of claim 1, wherein each metal loaded in the porous support structure of the pyrolysis catalyst structure is present in an amount from about 0.1 wt % to about 20 wt % based upon the total weight of the pyrolysis catalyst structure.

7. The method of claim 1, wherein the liquefaction catalyst structure is provided in a dual bed reactor within the liquefaction reaction system.

8. The method of claim 7, wherein the liquefaction catalyst structure comprises a first catalyst structure in a first bed of the dual bed reactor, the first catalyst structure comprises a mixed metal oxide structure including two or more of $Co_3O_4$, $Fe_2O_3$, NiO and $MnO_2$, and a single alkali metal loaded in the mixed metal oxide structure, and the single alkali metal loaded in the mixed metal oxide structure is present in an amount from about 0.1 wt % to about 10 wt % of the first catalyst structure.

9. The method of claim 8, wherein the liquefaction catalyst structure further comprises a second catalyst structure in a second bed of the dual bed reactor, the second catalyst structure comprises a porous support structure including one or more of an aluminum oxide, an aluminosilicate material, and a silicon oxide, and two or more metals loaded in the porous support structure, wherein the two or more metals loaded in the porous support structure are selected from the group consisting of Ni, Mo, Co, Ga, Ag, Zn and Ce, and each metal loaded in the porous support structure is present in an amount from about 0.1 wt % to about 20 wt % of the second catalyst structure.

10. The method of claim 1, wherein, based upon a total weight of the pyrolysis catalyst structure, Ga is loaded in amount of 1 wt %, Ce is loaded in amount of 10 wt %, and Zn is loaded in an amount of 5 wt %.

11. The method of claim 1, wherein the liquid bio-oil product has a first viscosity, and the method further comprises:
  introducing the liquid bio-oil product into a catalytic reactor located downstream from the pyrolysis reaction system to convert the liquid bio-oil product to a second oil product having a second viscosity that is less than the first viscosity.

* * * * *